(No Model.) 2 Sheets—Sheet 2.
S. H. MERRIDITH.
HARROW.
No. 524,260. Patented Aug. 7, 1894.
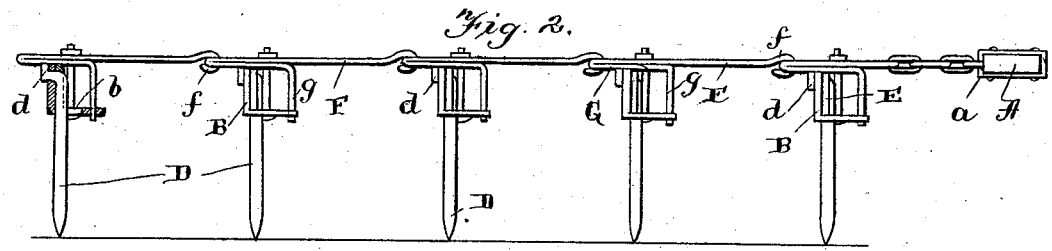
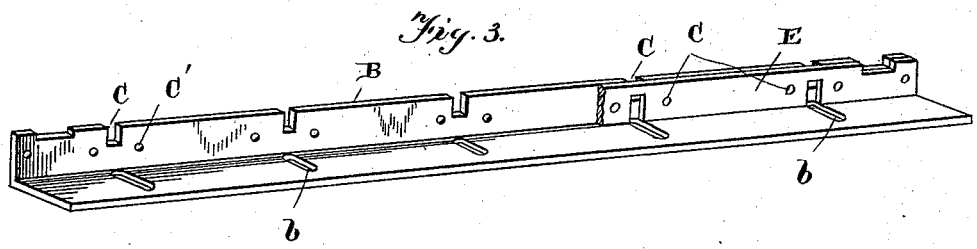
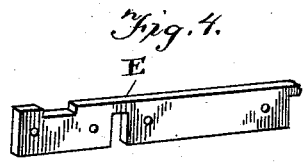
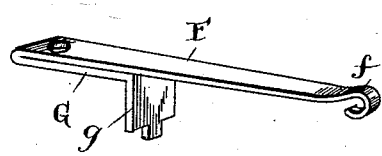
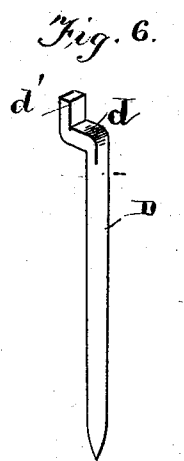
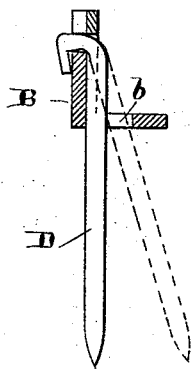
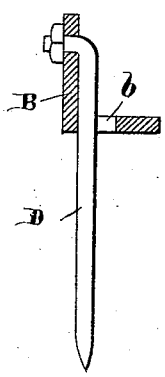
WITNESSES
Geo. E. Fuchs,
E. B. Hutchinson
INVENTOR
S. H. Merridith

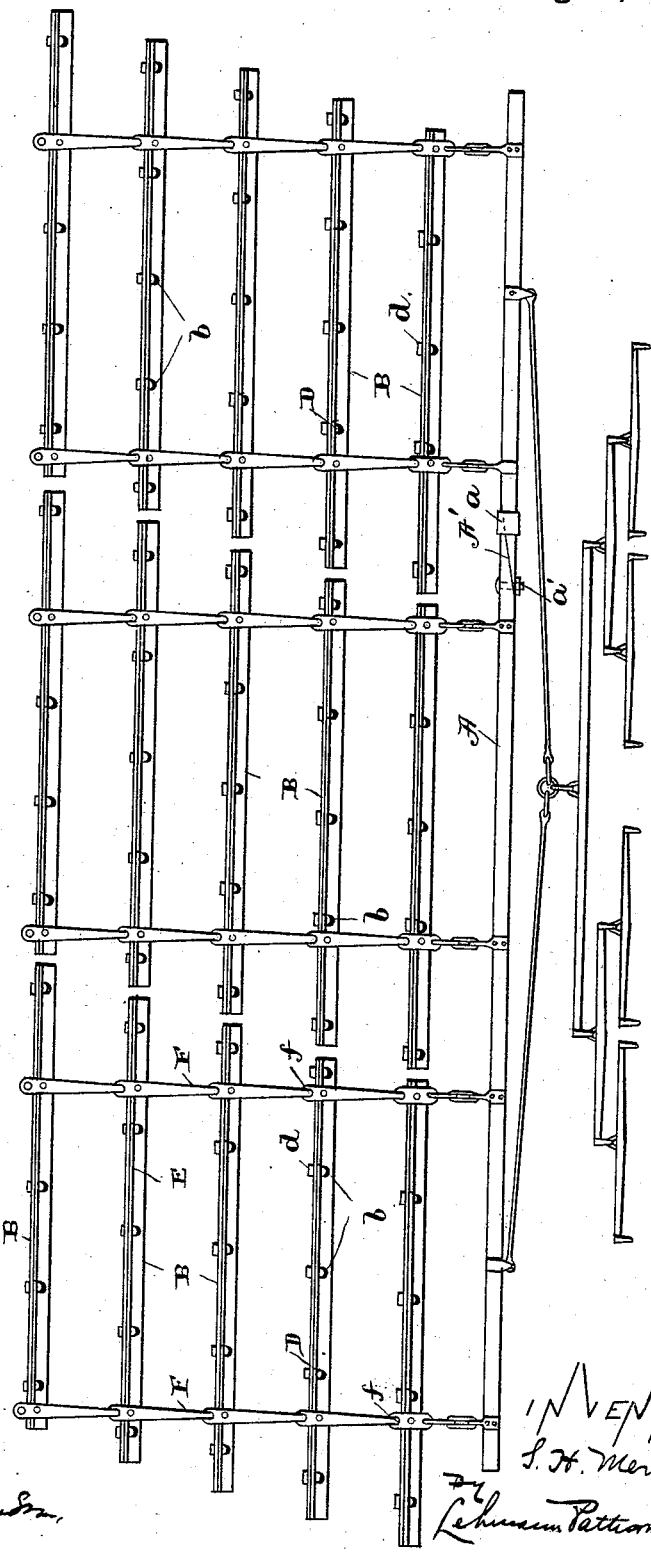

UNITED STATES PATENT OFFICE.

SAMUEL H. MERRIDITH, OF WEST LIBERTY, IOWA.

HARROW.

SPECIFICATION forming part of Letters Patent No. 524,260, dated August 7, 1894.

Application filed March 8, 1894. Serial No. 502,876. (No model.)

*To all whom it may concern:*

Be it known that I, SAMUEL H. MERRIDITH, of West Liberty, in the county of Muscatine and State of Iowa, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows: and it consists, primarily, in the novel manner of securing the teeth to the frame whereby they assume automatically either a vertical or inclined position, according to the direction in which the harrow is being moved.

The invention also consists in numerous other novel features of construction hereinafter fully described and claimed.

The object of my invention is to construct a harrow which may be used either as a drag or smoothing harrow without specially adjusting the teeth for the work desired, this adjustment being attained automatically by hitching to either one side or the other of the implement.

Referring to the accompanying drawings,— Figure 1 is a plan view of my improved harrow. Fig. 2 is an end view of the same. Fig. 3 is a detached perspective view of one of the bars. Fig. 4 is a similar view of one of the tooth binding plates. Fig. 5 is a similar view of one of the coupling bars. Fig. 6 is a detail view of my preferred form of tooth. Figs. 7 and 8 are similar views of modified forms of teeth shown in position.

The complete harrow is formed preferably of three sections as shown in Fig. 1, with the ends of the bars of each section arranged in oblique lines in order to secure more of a cross working effect when in operation. These sections may be connected on either side by the bar A extending nearly their entire length, and which is provided with the diagonal splice A' which is encircled by a band $a$ and clamped by bolt $a'$. Thus one of the sections may be easily dropped or detached if not desired for use as will be readily understood.

Each harrow section consists of a series of transverse angle bars B. The lower flanges of these bars are slotted transversely or in line with the draft as shown at $b$, while the vertical flanges of the same are slotted at C and provided with the perforations C' for the purpose presently to be explained. The teeth D extend down through slots $b$ and at their upper ends are formed with the offsets $d$ from which their ends are finally turned up as shown at $d'$. The offsets $d$ extend through slots C, and are therein held by plates E extending parallel with and secured to bars B by means of perforations C', though they are not held sufficiently rigid thereby to prevent backward and forward oscillation of the teeth in slots $b$. By this arrangement it will be understood that when the harrow is moved in the direction indicated by the arrow in Fig. 1 the teeth will be automatically drawn back in slots $b$ to substantially a vertical position, while an opposite movement of the implement will automatically change the adjustment of the teeth to an inclined or smoothing position. The slots C of the vertical flanges of the bars may be closed if desired, in which case the upper ends of the teeth are simply bent at an angle and projected therethrough and held in place by a nut or pin as illustrated in Fig. 8, or the teeth may be positioned in the manner above described when hot and then bent at their ends either downward or upward as may be desired for holding them from withdrawing. The teeth may also be formed with downwardly projected ends and held in place by plates E.

I do not wish to limit myself to any particular form of device for securing the teeth to the vertical flanges of the bars and any form of securing device may be adopted as may seem most advantageous. It may be stated, however, that when secured in place by the removable plate E the teeth may be readily removed and replaced for repairs, or for the substitution of new ones, and the same is also true of the nut and pin fastenings described above.

The several harrow bars are secured together by the coupling bars F each of which consists of a single piece of metal hooked at one end as shown at $f$ and at the opposite end turned back upon itself as shown at G and from thence turned down to form a foot $g$ which rests on the horizontal flange of the bar and which is formed with a stud upon its end which is clinched in a perforation in said bar flange. The doubled portion of the bar is formed with an eye to which the bar next it is coupled. The bar also rests on the vertical flange of the bar and is securely clamped thereto by bolt H.

Having thus fully described my invention, what I claim as new, and desire to secure by Letters Patent, is—

1. The combination of an angular harrow bar having a vertical flange, a coupling bar doubled upon itself and resting on said flange, and a foot formed by turning down the end of the doubled portion so as to rest on the bar, substantially as shown and described.

2. The combination of a harrow bar having an upright flange, a coupling bar doubled upon itself and resting on said flange, a foot formed by turning down the end of the said doubled portion so as to rest on the bar and which is secured thereto, and a bolt for clamping together the said bars, substantially as shown and described.

In testimony whereof I affix my signature in presence of two witnesses.

SAMUEL H. MERRIDITH.

Witnesses:
 GEO. W. GRIFFITH,
 J. N. B. PARVIN.